United States Patent
Zernickel

[11] Patent Number: 5,632,563
[45] Date of Patent: May 27, 1997

[54] RADIAL BEARING PARTICULARLY FOR BRIDGING A RADIAL DESIGN SPACE

[75] Inventor: Alexander Zernickel, Herzogenaurach, Germany

[73] Assignee: Ina Walzlager Schaeffler KG, Germany

[21] Appl. No.: 497,523

[22] Filed: Jul. 3, 1995

[30] Foreign Application Priority Data

Oct. 28, 1994 [DE] Germany ............... 44 38 564.1

[51] Int. Cl.⁶ .................. F16C 27/04; F16C 33/58
[52] U.S. Cl. .................. 384/564; 384/581; 384/625
[58] Field of Search ................... 384/581, 564, 384/569, 570, 625, 559, 560, 584, 513, 515, 535

[56] References Cited

U.S. PATENT DOCUMENTS

| | | |
|---|---|---|
| 3,653,731 | 4/1972 | Rau . |
| 4,696,581 | 9/1987 | Tsushima et al. ............... 384/625 |

FOREIGN PATENT DOCUMENTS

| | | | |
|---|---|---|---|
| 0131405 | 7/1946 | Australia .................. 384/564 |
| 0408283 | 3/1910 | France .................. 384/535 |
| 0986550 | 8/1951 | France .................. 384/535 |
| 2382611 | 9/1978 | France . |
| 2432113 | 2/1980 | France . |
| 6912859 | 3/1969 | Germany . |
| 7030106 | 8/1970 | Germany . |
| 2264117 | 7/1973 | Germany . |
| 2540793 | 4/1976 | Germany . |
| 0345204 | 4/1960 | Switzerland .................. 384/535 |
| 0195436 | 3/1965 | Switzerland .................. 384/581 |
| 0205655 | 10/1923 | United Kingdom .................. 384/581 |

*Primary Examiner*—Daniel P. Stodola
*Assistant Examiner*—Matthew A. Kaness
*Attorney, Agent, or Firm*—Bierman, Muserlian and Lucas LLP

[57] ABSTRACT

A radial bearing with an outer race ring or bush arranged between the bearing in a housing bore having an integrally formed portion which is bent at a certain angle to a bearing axis and merges into a portion extending coaxially with the outer race ring so that a structural unit open in an axial direction and having spring elastic properties is formed that can be economically manufactured and used in a wide variety of areas.

5 Claims, 1 Drawing Sheet

RADIAL BEARING PARTICULARLY FOR BRIDGING A RADIAL DESIGN SPACE

BACKGROUND OF THE INVENTION

A radial bearing whose outer race ring or bush arranged between the bearing and a housing bore has an integrally formed portion which is bent at a certain angle to a bearing axis and merges into a portion extending coaxially with the outer race ring so that a structural unit open in an axial direction and having spring-elastic properties is formed is known from French Patent No. 2,382,611. FIG. 5 of this patent shows a cylindrical roller bearing comprising an inner race ring with a milled raceway in which cylindrical rollers roll. At one end, the outer race ring merges integrally into a portion which is bent at an angle of approximately 30° to the bearing axis. This inclined portion in turn continues into a portion extending coaxially with the outer race ring so that a more or less V-shaped structural unit with spring-elastic properties comprised of the outer race ring, the inclined portion and the coaxial portion is formed. This V-shaped structure enables the bearing to be inserted under pre-tension into a housing bore.

A disadvantage of such a bearing arrangement is that a raceway for the axial guidance of the rolling elements has to be made in the inner ring or on a shaft. A further disadvantage arises from the fact that, due to the inclined arrangement of the portion connected to the outer race ring, a large axial design space is required, while in the radial direction, only a small design space can be bridged.

OBJECTS OF THE INVENTION

It is an object of the invention to improve the generic rolling bearing so that it can be economically manufactured and its field of use can be widened.

This and other objects and advantages of the invention will become obvious from the following detailed description.

SUMMARY OF THE INVENTION

The novel radial bearing of the invention with an outer race ring (1) or bush arranged between the bearing and a housing bore having an integrally formed portion (3) which is bent at a certain angle to a bearing axis and merges into a portion (4) extending coaxially with the outer race ring (1) so that a structural unit open in an axial direction and having spring-elastic properties is formed, is characterized in that a flange (2) pointing towards the center of the bearing is arranged on one end of the outer race ring (1), while the integrally formed portion (3), arranged on another end of the outer race ring (1), extends at an angle of about 90° to the bearing axis to bridge a radial design space between the bearing and the housing bore, said portion (3) comprising punched regions (9) which are spaced uniformly over a periphery thereof and shaped towards the center of the bearing into retaining lugs (8) of rolling elements (6) or a cage (7).

In a further embodiment of the invention, three uniformly spaced retaining lugs are provided, and the outer race ring and the coaxially extending portion have equal axial dimensions. Advantageously, the radial bearing of the invention is made by chipless shaping, and the entire bearing is subjected to a hardening treatment.

The advantage of such a bearing made in accordance with the invention is that the vertical arrangement of the portion on the outer race ring permits small axial dimensions while radially, a large design space can be bridged. Another advantage is that it is not necessary to fabricate profiled raceways for the axial guidance of the rolling elements because this function is assumed by the flange pointing towards the center of the bearing and by the retaining lugs spaced uniformly over the periphery. Finally, the bearing of the invention does not require an inner ring because the axial guidance of the rolling elements is assured by the outer ring. Furthermore, such a bearing can be economically manufactured by chipless shaping. Manufacturing is also facilitated by the fact that the bearing is hardened as a whole.

BRIEF DESCRIPTION OF THE EMBODIMENTS

Figure 1:
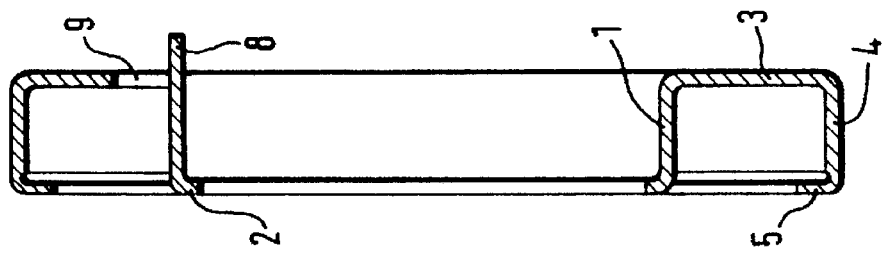
FIG. 1 is a longitudinal cross-section through a needle roller bush of the invention.

The needle roller bush of FIG. 1 is made by chipless shaping and comprises the race ring (1) provided at one end with an inwardly oriented flange (2). On its other end, the race ring (1) is integrally connected with a portion (3) oriented vertically away from the center of the bearing and merging in its turn into a portion (4) which extends coaxially with the outer race ring (1). At its free end, this portion (4) comprises a flange (5) pointing towards the center of the bearing. In this way, a U-shaped structural unit open in an axial direction and having spring-elastic properties is formed with its main components being the elements 1, 3 and 4. While the portion (4) is required in the first place for the retention of the bearing in a housing, not shown, the portion (3) is made in conformity with the dimension of the radial design space to be bridged.

Figure 3:
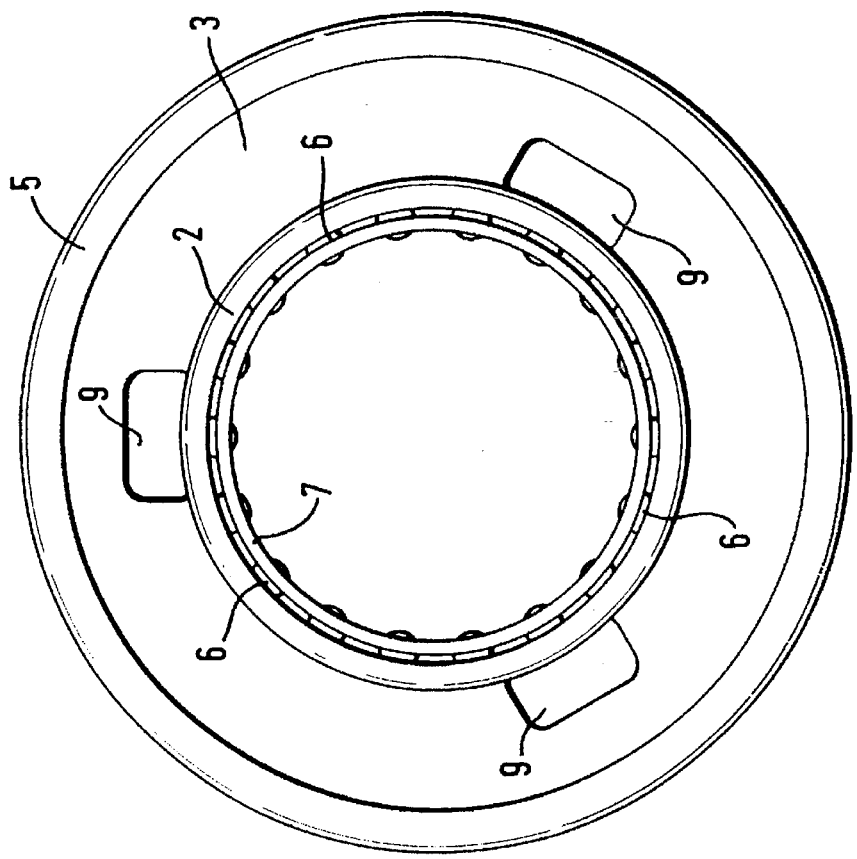
FIG. 3 is a side view of the needle roller bearing of FIG. 2.
Figure 2:
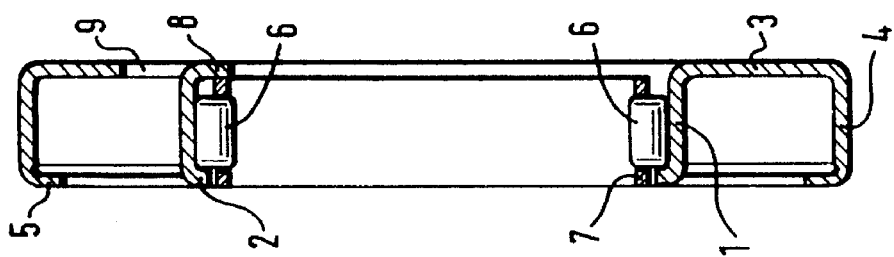
FIG. 2 is a longitudinal cross-section through a needle roller bearing of the invention.

The bush bearing shown in its entirety in FIGS. 2 and 3 is equipped with bearing needle rollers (6) which are retained in a cage (7). The axial guidance of the needle rollers (6) is effected by their abutment against the flange (2) of the race ring (1) and by the abutment of the cage (7) against retaining lugs (8). The three retaining lugs (8) are formed by turning over three punched regions (9) of the portion (3). It is to be understood that the invention is not limited to the embodiment described herein. More particularly, it is conceivable to use balls as rolling elements in place of the needle rollers (6).

Various other modifications of the radial bearings of the invention may be made without departing from the spirit or scope thereof and it is to be understood that the invention is intended to be limited only as defined in the appended claims.

What is claimed is:

1. A radial bearing with an outer race ring (1) having an integrally formed portion (3) bent at an angle of 90° to a bearing axis to bridge a radial design space, said portion (3) merging into a portion (4) extending coaxially with the outer race ring (1) so that a structural unit open in one axial direction is formed, a flange (2) pointing towards the center of the bearing being arranged on one end of the outer race ring (1), characterized in that the integrally formed portion (3) comprises punched regions (9) each forming an opening in said integrally formed portion, said punched regions are uniformly spaced over a periphery thereof and inwardly bent towards the center of the bearing to form retaining lugs (8) for retaining rolling elements (6) or a cage (7).

2. A radial bearing of claim 1 comprising three uniformly spaced retaining lugs (8).

3. A radial bearing of claim 1 wherein the outer race ring (1) and the coaxially extending portion (4) have equal axial dimensions.

4. A radial bearing of claim 1 made by chipless shaping.

5. A radial bearing of claim 1 wherein the entire bearing is hardened.

* * * * *